(12) United States Patent
Bai et al.

(10) Patent No.: US 12,273,899 B2
(45) Date of Patent: Apr. 8, 2025

(54) BASE STATIONS, METHOD AND DEVICE FOR COMMUNICATION BETWEEN BASE STATIONS, AND STORAGE MEDIUM

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 635 days.

(21) Appl. No.: 17/639,587

(22) PCT Filed: May 19, 2020

(86) PCT No.: PCT/CN2020/091121
§ 371 (c)(1),
(2) Date: Mar. 2, 2022

(87) PCT Pub. No.: WO2021/057048
PCT Pub. Date: Apr. 1, 2021

(65) Prior Publication Data
US 2022/0303980 A1 Sep. 22, 2022

(30) Foreign Application Priority Data
Sep. 29, 2019 (CN) .......................... 201910936226.5

(51) Int. Cl.
*H04W 72/27* (2023.01)
*H04W 72/02* (2009.01)
*H04W 72/0446* (2023.01)

(52) U.S. Cl.
CPC ........... *H04W 72/27* (2023.01); *H04W 72/02* (2013.01); *H04W 72/0446* (2013.01)

(58) Field of Classification Search
CPC . H04W 72/27; H04W 72/02; H04W 72/0446; H04W 28/0205; H04W 28/04
See application file for complete search history.

(56) References Cited

U.S. PATENT DOCUMENTS

2014/0219162 A1  8/2014  Eyuboglu et al.
2014/0301201 A1  10/2014 Ozturk et al.
(Continued)

FOREIGN PATENT DOCUMENTS

| CN | 103051412 A | 4/2013 |
| CN | 108737010 A | 11/2018 |

(Continued)

OTHER PUBLICATIONS

CATT, "Interference management for dynamic TDD and flexible duplex", 3GPP TSG RAN WG1 Meeting #88, Athens, Greece Feb. 13-17, 2017, total 3 pages, R1-1702113.
(Continued)

*Primary Examiner* — Kyaw Z Soe
(74) *Attorney, Agent, or Firm* — Kilpatrick Townsend & Stockton LLP (57) ABSTRACT

The present application discloses base stations, a method and device for communication between base stations, and a storage medium. The method includes exchanging, by means of an air interface signal, respective states of N time-domain resources of a designated resource with a second base station that uses the designated resource, and N≥1, the designated resource is a resource for communication between base stations, and the N time-domain resources are obtained by means of division on the basis of a time-division multiplexing (TDM) technique.

15 Claims, 3 Drawing Sheets gNB0 gNB3

Centralized Unit/ Core Network gNB1 gNB2

(56) References Cited

U.S. PATENT DOCUMENTS

| | | |
|---|---|---|
| 2015/0036571 A1 | 2/2015 | Taori et al. |
| 2015/0131553 A1 | 5/2015 | Centonza et al. |
| 2016/0337994 A1 | 11/2016 | Han et al. |
| 2022/0330228 A1* | 10/2022 | Hu ................. H04W 72/0446 |

FOREIGN PATENT DOCUMENTS

| | | |
|---|---|---|
| CN | 109219063 A | 1/2019 |
| CN | 110167186 A | 8/2019 |
| EP | 2253164 A1 | 11/2010 |
| EP | 2837127 A2 | 2/2015 |
| EP | 3089530 A1 | 11/2016 |
| WO | 2016159865 A1 | 10/2016 |

OTHER PUBLICATIONS

MediaTek Inc., "Interference management in Nr", 3GPP TSG RAN WG1 Meeting #88, Athens, Greece, Feb. 13-17, 2017, total 21 pages, R1-1702719.

* cited by examiner

Fig. 1

Exchange, through an air interface signal, states of N time-domain resources of a designated resource with a second base station that uses the designated resource — S200

BASE STATIONS, METHOD AND DEVICE FOR COMMUNICATION BETWEEN BASE STATIONS, AND STORAGE MEDIUM

CROSS REFERENCE TO RELATED APPLICATIONS

This application is a national phase entry under 35 U.S.C. § 371 of International Application No. PCT/CN2020/091121, filed on May 19, 2020, which claims priority of Chinese Patent Application No. 201910936226.5, filed with the China National Intellectual Property Administration (CNIPA) on Sep. 29, 2019, and entitled "Base stations, method and device for communication between base stations, and storage medium", the entire content of which is incorporated herein by reference.

FIELD

This application relates to the field of communications, in particular to base stations, a method and device for communication between the base stations, and a storage medium.

BACKGROUND

In a general New Radio (NR) communication system, a network coverage range is divided into cells. Each cell is usually served by a base station (BS). Each base station is called a serving base station of the corresponding cell. Each BS will provide data transmission services for user equipment (UE) in its own cell.

In traditional wireless communication networks, base stations maintain a working mode independent of each other. That is, each base station is only responsible for uplink and downlink scheduling and providing uplink and downlink data transmission services for the UE in its own cell. One base station generally does not provide data transmission services for UE in other cells, and one base station generally does not perform information exchange and data transmission operations with other base stations.

However, as communication services become more and more complex, there are scenarios that require communication between the base stations to achieve information exchange and data transmission, for example, an inter-cell interference coordination information interaction scenario, a scenario where the network is still available when a disaster occurs, and so on.

Therefore, how to achieve good communication between the base stations to provide better services for the user equipment has become an urgent problem to be solved.

SUMMARY

The present application aims to provide base stations, a method and device for communication between the base stations, and a storage medium, to realize good communication between the base stations and provide support for providing users with better services.

In some embodiments of the present application provide a method for communication between base stations, applied in a first base station.

The method includes: exchanging, through an air interface signal, states of N time-domain resources of a designated resource with a second base station that uses the designated resource. Here, N≥1, the designated resource is a resource for communication between the base stations. The N time-domain resources are obtained by division in a time-division multiplexing (TDM) mode. In one embodiment, a state of each time-domain resource is one of an occupied state, an idle state, or a resource collision state.

Thus, the states of the N time-domain resources are exchanged through the air interface signal, so that the occurrence of resource collisions can be reduced as much as possible, or resource collisions can be quickly discovered and solved after occurring, to ensure the time latency requirements and reliability of a communication system.

In one embodiment, the exchanging, through an air interface signal, states of the N time-domain resources of the designated resource with the second base station that uses the designated resource, includes:

receiving an air interface signal on a time-domain resource that is not occupied by the first base station in the designated resource, and the air interface signal is transmitted by at least one second base station and configured to indicate states, detected out by the second base station, of the N time-domain resources; and determining respective states of the N time-domain resources based on the received air interface signal.

Thus, the first base station may perform information exchange and data transmission with other base stations through the air interface signal, and may monitor the occupation of the N time-domain resources using the same communication resource by other base stations, so that the occurrence of resource collisions can be reduced as much as possible, or resource collisions can be quickly discovered and solved after occurring, to ensure the time latency requirements and reliability of the communication system.

In one embodiment, the exchanging, through the air interface signal, states of the N time-domain resources of the designated resource with the second base station that uses the designated resource, further includes:

selecting an idle resource from the N time-domain resources according to the states of the N time-domain resources carried in the received air interface signal; and transmitting an air interface signal by using the selected idle resource, and the transmitted air interface signal is configured to indicate states, detected out by the first base station, of the N time-domain resources.

Thus, the first base station may perform information exchange and data transmission with other base stations through the air interface signal, and may notify other base stations of the respective states of the N time-domain resources detected by the first base station, so that other base stations can know the occupation of the N time-domain resources, and the occurrence of resource collisions can be reduced as much as possible, or resource collisions can be quickly discovered and solved after occurring, to ensure the time latency requirements and reliability of the communication system.

In one embodiment, the states of the N time-domain resources are detected in the following manner for each time-domain resource.

If an air interface signal is not received on the time-domain resource within at least one detection period, the time-domain resource is in an idle state; if an air interface signal transmitted by one second base station is detected out on the time-domain resource within one detection period, the time-domain resource is in an occupied state; and if air interface signals transmitted by at least two second base stations are detected out on the time-domain resource within one detection period, the time-domain resource is in a resource collision state. The detection period is a time-division multiplexing period of the designated resource.

Thus, the first base station may determine the occupation of the N time-domain resources by other base stations through the air interface signal detected within the detection period, to provide support for notifying communication between the base stations of the respective states of the N time-domain resources, so that the occurrence of resource collisions can be reduced as much as possible, or resource collisions can be quickly discovered and solved after occurring, to ensure the time latency requirements and reliability of the communication system.

In one embodiment, after transmitting the air interface signal by using the selected idle resource, the method further includes:
if an received air interface signal indicates that the time-domain resource occupied by the first base station is in a resource collision state, reselecting an idle resource from the N time-domain resources to transmit the air interface signal by using the reselected idle resource.

Thus, through communication between the base stations and mutual notification of the respective states of the N time-domain resources, resource collisions can be quickly discovered and solved quickly, to ensure the time latency requirements and reliability of the communication system.

In one embodiment, sizes of the N time-domain resources are the same or not completely the same. Therefore, each time-domain resource of communication resources between the base stations may be divided according to service requirements to ensure the time latency requirements and reliability of the communication system.

In some embodiments of the present application provide a first base station, including a processor, a memory and a transceiver.

The processor is configured to read a program in the memory and perform:
exchanging, through an air interface signal, states of N time-domain resources of a designated resource with a second base station that uses the designated resource. N≥1, the designated resource is a resource for communication between the base stations, and the N time-domain resources are obtained by division on the basis of a time-division multiplexing (TDM) technique.

In one embodiment, a state of each time-domain resource is one of being occupied, being idle, or resource collision.

In one embodiment, the transceiver is configured to:
receive an air interface signal on a time-domain resource that is not occupied by the first base station in the designated resource, and the air interface signal is transmitted by at least one second base station and configured to indicate states, detected out by the second base station, of the N time-domain resources.

The processor is configured to:
determine respective states of the N time-domain resources based on the received air interface signal.

In one embodiment, the processor is further configured to:
select an idle resource from the N time-domain resources according to the states of the N time-domain resource carried in the received air interface signal.

The transceiver is configured to:
transmit an air interface signal by using the selected idle resource. The transmitted air interface signal is configured to indicate states, detected out by the first base station, of the N time-domain resources.

In one embodiment, the processor is configured to detect the states of the N time-domain resources in the following manner for each time-domain resource.

If an air interface signal is not received on the time-domain resource within at least one detection period, the time-domain resource is in an idle state. The detection period is a time-division multiplexing period of the designated resource.

If an air interface signal transmitted by one second base station is detected out on the time-domain resource within one detection period, the time-domain resource is in an occupied state.

If air interface signals transmitted by at least two second base stations are detected out on the time-domain resource within one detection period, the time-domain resource is in a resource collision state.

In one embodiment, after transmitting the air interface signal by using the selected idle resource, the processor is further configured to:
if an received air interface signal indicates that the time-domain resource occupied by the first base station is in a resource collision state, reselect an idle resource from the N time-domain resources to transmit the air interface signal by using the reselected idle resource.

In one embodiment, sizes of the N time-domain resources are the same or not completely the same.

In some embodiments of the present application provide a device for communication between base stations, including:
a communication device, configured to exchange, through an air interface signal, states of N time-domain resources of a designated resource with a second base station that uses the designated resource. N≥1, the designated resource is a resource for communication between the base stations, and the N time-domain resources are obtained by means of division on the basis of a time-division multiplexing (TDM) technique.

In one embodiment, a state of each time-domain resource is one of an occupied state, an idle state, or a resource collision state.

In one embodiment, the communication device includes:
a signal receiving device, configured to receive an air interface signal on a time-domain resource that is not occupied by the first base station in the designated resource, and the air interface signal is transmitted by at least one second base station and configured to indicate states, detected out by the second base station, of the N time-domain resources; and
a state determining device, configured to determine respective states of the N time-domain resources based on the received air interface signal.

In one embodiment, the communication device further includes:
a resource selecting device, configured to select an idle resource from the N time-domain resources according to the state of each time-domain resource carried in the received air interface signal; and
a signal transmitting device, configured to transmit an air interface signal by using the selected idle resource, and the transmitted air interface signal is configured to indicate states, detected out by the first base station, of the N time-domain resources.

In one embodiment, after transmitting the air interface signal by using the selected idle resource, the resource selecting device is further configured to:
if an air interface signal received by the signal receiving device indicates that the time-domain resource occupied by the first base station is in a resource collision state, reselect an idle resource from the N time-domain resources to transmit the air interface signal by using the reselected idle resource.

In some embodiments of the present application provide a computer storage medium, the computer storage medium stores computer executable instructions, and the computer executable instructions are configured to make a computer execute the method according to other embodiments.

The base stations, the method and device for communication between the base stations, and the storage medium provided in the embodiments of the present application can realize information exchange and data transmission between the base stations through air interface communication, and can ensure the time latency requirements and reliability.

Embodiments of the present application will be described in the following description. Other embodiments of the present application may be realized and obtained through structures specifically pointed out in the written description, claims, and drawings.

BRIEF DESCRIPTION OF THE DRAWINGS

Embodiments of the present disclosure are described in the drawings that need to be used in the embodiments or the present disclosure will be briefly introduced below. Apparently, the drawings introduced below are only some embodiments of the present disclosure, other drawings can also be obtained according to these drawings.

DETAILED DESCRIPTION OF THE EMBODIMENTS

In the following, some terms in the embodiments of the present application are explained below.
(1) In the embodiments of the present application, the terms "network" and "system" are often used alternatively, but their meanings are readily understood.
(2) In the embodiments of the present application, the term "a plurality of" means two or more and the other quantifiers are similar.
(3) "And/Or" describes the relationship of associated objects, indicating that there may be three relationships, for example, A and/or B, which may indicate: there are three cases of A alone, A and B simultaneously, and B alone. The character "I" generally indicates that the associated objects are in an "or" relationship.
(4) In the embodiments of the present application, "first" and "second" are only used to distinguish described objects, but not to limit their functions.

A network architecture are described in the embodiments of the present application are intended to more clearly illustrate the embodiments of the present application, and do not constitute a limitation on the embodiments of the present application. In some embodiments, with the evolution of the network architecture and the emergence of new implementation scenarios, the embodiments of the present application are equally applicable to similar problems.

In a general NR communication system, a network coverage range is divided into cells, and each cell is usually served by a base station (BS). Each base station is called a serving base station of the corresponding cell. Each BS will provide data transmission services for user equipment (UE) in the own cell.

In traditional wireless communication networks, each base station maintains a relatively independent working mode, that is, each base station is only responsible for uplink and downlink scheduling and providing uplink and downlink data transmission services for the UE in the own cell. One base station generally does not provide data transmission services for UE in other cells, and one base station generally does not perform information exchange and data transmission operations with other base stations.

However, as communication services become more and more complex, there are scenarios that require communication between the base stations to achieve information exchange and data transmission, for example, an inter-cell interference coordination information interaction scenario, a scenario where the network is still available when a disaster occurs, and so on.

As an example, description is made through following two scenarios.

Scenario 1, the Inter-Cell Interference Coordination Information Interaction Scenario.

In an independent transmission network, user equipment (UE) at the cell edge in each cell tends to have poor performance. This is because, firstly, the UE at the cell edge is far away from its serving base station, and the transmission performance of the cell is poor; and secondly, the UE at the cell edge is relatively close to a base station of a neighboring cell and suffers more severe interference from the neighboring cell. In order to improve the performance of a wireless network, especially to improve the transmission quality of the user equipment at the cell edge to improve the experience, a degree of cooperation may be carried out between base stations, especially between adjacent base stations, to improve the transmission quality. That is to say, one base station can not only provide services for the user equipment in the own cell, but further provide services for UE in the neighboring cell, or, create better communication conditions (for example, reduce interference) for the services of the user equipment in the neighboring cell.

In interference coordination information, for example, it may indicate that a base station A transmits a signal with power C on a resource B, so other base stations know the interference of the base station A to themselves, and may perform operations such as scheduling UE, and selecting MCS to optimize system performance. The important scenario here is downlink (DL) semi-persistent scheduling (SPS) or uplink (UL) configuration grant, the resource occupation is unchanged for a long time. In this scenario, the interference coordination information needs to be exchanged between the base stations.

Scenario 2, the Scenario where the Network is Still Available when a Disaster Occurs.

When the disaster occurs, if the base stations may directly communicate with each other, few surviving base stations may still maintain partial network coverage, realize emergency communication, and reduce the losses caused by the disaster.

Therefore, at least in the above two scenarios, communication between the base stations is required.

Currently, there are two following solutions (a) and (b) for communication between the base stations.

(a) Based on an X2/Xn Interface Between the Base Stations.

Communication through the X2/Xn interface does not require occupying air interface resources, but there are still many shortcomings. For example, an interactive information capacity is limited, and only simple information may be exchanged. For another example, the interaction speed is slow, often as long as about 20 ms, which cannot meet the time latency requirements of businesses. When two base stations are subjected to interference coordination, it may take 20 ms for the interference coordination information to reach a target base station, after the coordination information on the X2 interface is transmitted out, wireless channel conditions often change significantly, and business data may have timed out, and therefore, the coordination performance between the base stations is poor.

(b) Through an Air Interface (OTA Interface).

Communication through the air interface (OTA interface) requires occupying the air interface resources, and usually requires a contention access mechanism similar to WiFi, which may cause collision problems, and a mode of retrying after a collision may cause a serious delay problem.

In addition, there is a radio frequency problem in the communication between the base stations through the air interface, that is, the signal needs to meet performance requirements to reach the target base station. The requirements indicator may be the sensitivity for receiving the signal, and the value of the sensitivity is related to various factors, such as a modulation and coding scheme (MCS) adopted by the signal. Assuming that the sensitivity between the base stations and the sensitivity between base station and user equipment are the same, transmission between the base stations is LOS transmission, and there is no fading such as shadows, thus under the same distance conditions, the signal receiving power of the former is about 30 dB greater than that of the latter. Communication between the base stations through the air interface may be separated by frequency, and an out-of-band communication mode is used, that is, different frequencies are used between the base stations and between the base station and user equipment; and however, a communication mode in the same frequency band may also be used, depending on frequency resources obtained by an operator. When communicating in the same frequency band, because self-interference (interference of spontaneous transmission and self-reception) is not allowed to occur, when communicating between gNBs, the transmission and reception of the gNBs must be synchronized with the transmission and reception of gNB-UE, that is, the gNB cannot transmit and receive at the same time, and no additional RF consideration is required.

In view of this, embodiments of the present application provide a communication solution between base stations, which may realize information exchange and data transmission between the base stations through air interface communication, not only can reduce the occurrence of collisions, but also can quickly discover and solve the collisions after the collisions occur, to ensure the time latency requirements and reliability of the communication system.

The embodiments of the present application are described in the following explains terms appearing in the embodiments of the present application, and it should be noted that the explanation of the terms in the embodiments of the present application is only to facilitate the understanding of the solutions, and is not used to limit the solution. The terms involved include Collision.

Collision: When two or more gNBs determine that a resource is idle and transmit an air interface signal on the resource at the same time, a collision occurs; and if any other gNBs detect a collision on a resource, the occurrence of the collision is indicated according to a present mode.

When the gNBs have a collision, other gNBs that do not have a collision may transmit interactive information on resources occupied by themselves, and the interactive information includes a resource occupation indication signal, including a resource indication for the collision.

When a gNB A detects that other gNB(s) indicate that the gNB A has a collision, the gNB A should withdraw from the occupation of the collision resource, and then reselect an idle resource according to its own ranking for resource priorities or randomly.

Each gNB may enter a communication interaction mode between the gNBs, and may also exit the communication interaction mode, and gives resources to other gNBs for use, and whether each gNB enters or exits the communication interaction mode may be notified to other gNBs through the air interface signal.

Embodiments of the present disclosure will be described clearly and completely below with reference to the accompanying drawings in the embodiments of the present disclosure.

Figure 1:
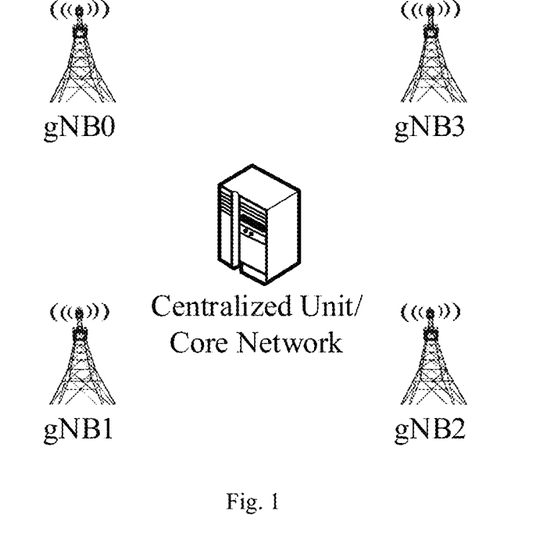
FIG. 1 is an architecture schematic diagram of a system for communication according to an embodiment of the present application.

FIG. 1 is an architecture schematic diagram of a communication system according to an embodiment of the present application.

As shown in FIG. 1, the communication system of the present application may include, for example, a centralized unit (CU) or core network, and a base station cluster (for example, including base stations such as gNB0, gNB1, gNB2, and gNB3).

Each base station in the base station cluster may join or exit an inter-base station (gNB) communication mode to realize communication with the CU or the core network or other base stations. Mutual information exchange and data transmission between the centralized unit (CU) or the core network and the base station cluster, and between the base stations in the base station cluster may be realized through an air interface signal.

In embodiments of the present application, a designated resource for communication between the base stations may be divided into N parts by a time-division multiplexing (TDM) technique to obtain N time-domain resources, and sizes of the N time-domain resources may be the same or different, or not completely the same. Each time-domain resource may have a guard period GP to provide time synchronization difference and a time interval required for receiving and transmitting conversion.

Each base station may receive key parameters of the air interface signal for inter-gNB communication from the centralized unit (CU) or the core network, such as a frequency domain resource location, a time-division multiplexing period P, inter-gNB TDM resource division, a frequency synchronization reference gNB0, a guard period on each resource and other basic configuration information, and realize time-frequency domain synchronization between the base stations, determines division of the N resources, and so on. The time synchronization of the gNBs may adopt an absolute synchronization method, such as GPS synchronization; and the frequency synchronization may, for example, use a reference base station gNB0 to complete the air interface time-frequency synchronization between the gNBs.

Each gNB may receive the air interface signal for inter-gNB communication on the N time-domain resources, and determine respective states of the N time-domain resources based on the received air interface signal, such as which time-domain resources of the N time-domain resources are in an idle state, which time-domain resources are in an occupied state, which time-domain resources have a resource collision, and so on. Each gNB should at least receive the air interface signal transmit by the reference base station gNB0, to realize the time-frequency domain synchronization between the base stations, and know division of the N time-domain resources, and so on.

Each gNB may select an idle resource from the time-domain resources determined to be idle among the N time-domain resources (for example, it may be selected in the order of priority or randomly, which is not limited in the present application), for example, an idle time-domain resource R1 is selected for transmitting the air interface signal. Each gNB may receive the air interface signal(s) on other N−1 time-domain resources other than the time-domain resource occupied by itself (that is, the selected time-domain resource R1 for transmitting the air interface signal), to know the respective states of the N time-domain resources.

The air interface signal transmitted by each gNB may include the respective states, detected out by the gNB itself, of the N time-domain resources, such as an idle state, an occupied state, or a resource collision state. The above air interface signal may also carry interference coordination information, for example, the gNB is communicating with UE C (location information) on a resource B, and the transmission power is D. The above air interface signal may also include real business data. When a gNB does not need to transmit the air interface signal (for example, exits the inter-base station communication mode), it may also be an exit indication signal transmitted by the gNB.

During implementation, each gNB itself may detect the states of the N time-domain resources in the following manner (for the convenience of description, a time-division multiplexing period of the designated resource is named a detection period): for each time-domain resource, if the air interface signal is not received on the time-domain resource within at least one detection period, the time-domain resource is in an idle state; if the air interface signal transmitted by one second base station is detected out on the time-domain resource within one detection period, the time-domain resource is in an occupied state; and if the air interface signals transmitted by at least two second base stations are detected out on the time-domain resource within one detection period, the time-domain resource is in a resource collision state.

When two or more gNBs determine that a time-domain resource is idle and simultaneously transmit air interface signals on the time-domain resource, a resource collision occurs. If any other gNB detects that a resource collision occurs on a time-domain resource, the occurrence of the collision is indicated in a predetermined manner. For example, when the gNBs have a collision, other gNBs that have no collision may transmit the air interface signal on the time-domain resources occupied by themselves, and the air interface signal carries an indication signal indicating that a resource collision occurs on a time-domain resource. When the gNB that receives the indication signal determines that the time-domain resource occupied by itself has a collision, the gNB exits the time-domain resource and searches for an idle resource again.

For example, if the base stations gNB1, gNB2, and gNB3 have all entered the inter-gNB communication mode, the base stations gNB2 and gNB3 both use a time-domain resource R2 to transmit air interface signals, and the gNB1 receives the air interface signals of the base stations gNB2 and gNB3 on the time-domain resource R2, so the gNB1 determines that the base stations gNB2 and gNB3 have a resource collision on the time-domain resource R2. In the air interface signal transmitted by the gNB1 on the time-domain resource R1, it indicates that the base stations gNB2 and gNB3 have a resource collision, so that after receiving the air interface signal, the base stations gNB2 and gNB3 may know that a resource collision occurs, so they exit the time-domain resource, and continue to search for other idle resources for transmitting the air interface signals.

If a gNB intends to exit a time-domain resource occupied by itself or exit the inter-gNB communication mode, the gNB may also transmit the exit indication signal, so that other base stations can know the respective states of the N time-domain resources in time.

So far, the communication solution between the base stations of the present application has been described in detail with reference to the communication system of FIG. 1. In the above embodiments, the resource for communication between the base stations is divided into N parts in a TDM mode. Each gNB may select one idle resource to transmit the air interface signal to other gNBs, and receive the air interface signals transmitted by other gNBs on other N−1 time-domain resources, and the air interface signal used for interaction may include the respective states, detected by the gNBs, of the N time-domain resources, for example, including being occupied, being idle, collision, etc., to achieve information exchange and data transmission between the base stations. Thus, through the air interface signals, the states of the N time-domain resources are exchanged, so the occurrence of resource collisions is reduced as much as possible, or the resource collisions can be quickly discovered and solved after occurring, to ensure the time latency requirement and reliability of the communication system.

Figure 2:
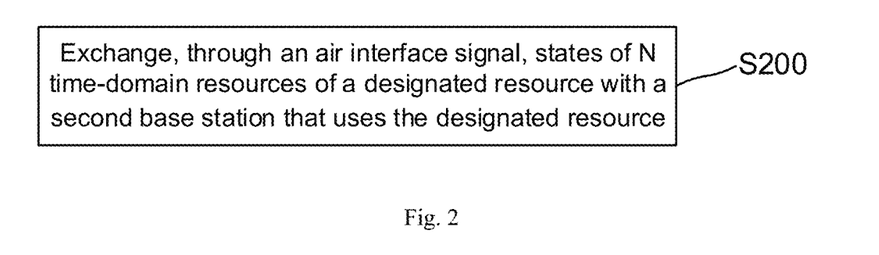
FIG. 2 is a schematic flowchart of a method for communication according to an embodiment of the present application.

FIG. 2 is a schematic flowchart of a method for communication according to an embodiment of the present application. The method for communication may be applied in the base stations gNBs as described above. In the following embodiments, in order to facilitate the distinction between described objects, the base stations are divided into a first base station, a second base station, and a reference base station. It should be understood that in the embodiments of the present application, the first base station, the second base station, or the reference base station may all be base stations with the same configuration or functions.

As shown in FIG. 2, in step S200, through air interface signals, respective states of N time-domain resources of a designated resource are exchanged with the second base station that uses the designated resource.

The above designated resource may be a resource for communication between the base stations, such as a frequency domain resource. In some embodiments, the designated resource may be divided into N parts in a time-division multiplexing (TDM) mode to obtain N time-domain resources. N≥1, and N is a positive integer. A state of each time-domain resource may be one of an occupied state, an idle state, or a resource collision state.

Thus, through the divided time-domain resources and the air interface signals, information exchange and data transmission between the base stations are realized, so that different base stations can know the occupation of the same designated resource by other base stations, to avoid the occurrence of collisions as much as possible and ensure the time latency requirements and reliability of a communication system.

In some embodiments, the exchanging, through the air interface signal, the states of the N time-domain resources of the designated resource with the second base station that uses the designated resource, may include: the air interface signal is received on a time-domain resource that is not occupied by the first base station in the designated resource, the air interface signal is transmitted by at least one second base station and configured to indicate states, detected out by the second base station, of the N time-domain resources; and the respective states of the N time-domain resources are determined based on the received air interface signal.

In some embodiments, the exchanging, through the air interface signal, the states of the N time-domain resources of the designated resource with the second base station that uses the designated resource, may further include: an idle resource is selected from the N time-domain resources according to the states of the N time-domain resources carried in the received air interface signal; and the air interface signal is transmitted by using the selected idle resource, and the transmitted air interface signal is configured to indicate states, detected out by the first base station, of the N time-domain resources.

In some embodiments, the first base station may detect the states of the N time-domain resources in the following manner: for each time-domain resource, if the air interface signal is not received on the time-domain resource within at least one detection period, the time-domain resource is in an idle state; if the air interface signal transmitted by one second base station is detected out on the time-domain resource within one detection period, the time-domain resource is in an occupied state; and if the air interface signals transmitted by at least two second base stations are detected out on the time-domain resource within one detection period, the time-domain resource is in a resource collision state. The detection period is a time-division multiplexing period of the designated resource.

In some embodiments, after the first base station transmits the air interface signal by using the selected idle resource, the method further includes: if the received air interface signal indicates that the time-domain resource occupied by the first base station has a resource collision, an idle resource is reselected from the N time-domain resources to transmit the air interface signal by using the reselected idle resource.

In some other embodiments, the air interface signal may also include target data. For example, the target data may be interference coordination information or business data, to realize information exchange and data transmission between the base stations.

Figure 3:
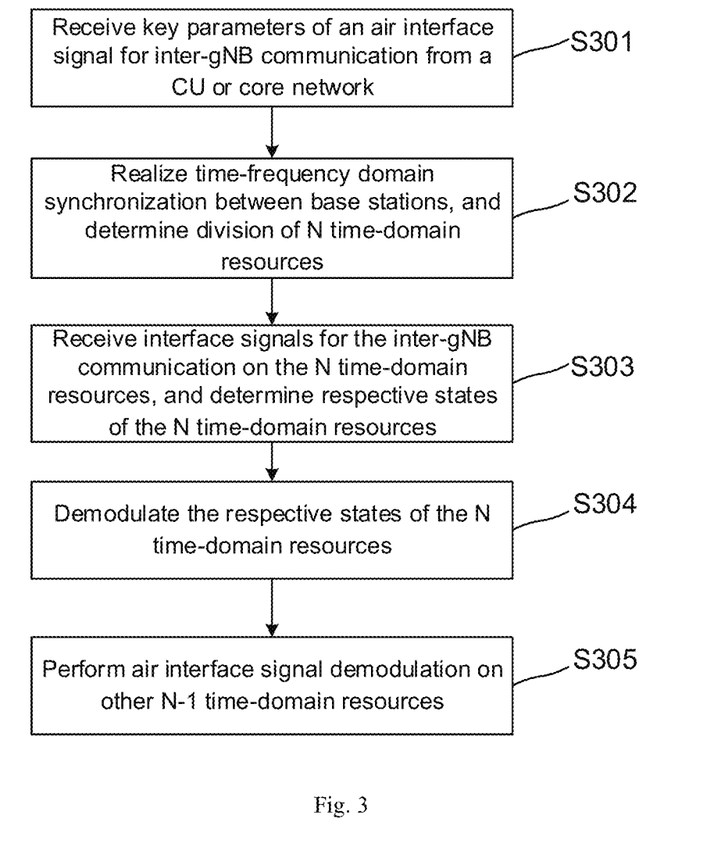
FIG. 3 is a schematic flowchart of a method for communication according to an embodiment of the present application.

FIG. 3 is a schematic flowchart of a method for communication according to an embodiment of the present application. A first base station is used as a described object to describe the method for communication implemented by the base station in the present application. The first/second base station or the following reference base station may all be used as signal transmitters to transmit air interface signals outwards, and may also be used as target receivers to receive air interface signals transmitted by other base stations. In the entire range where M base stations cover, one base station transmits an air interface signal, and the other M−1 base stations may be the target receivers of the air interface signal. In addition, the order of whether the first/second base station receives the air interface signal first or transmits the air interface signal first is not fixed.

As shown in FIG. 3, in step S301, the first base station (gNB1) may receive key parameters of the air interface signal for the inter-gNB communication from a CU or core network, such as a frequency domain resource location, a time-division multiplexing period P, inter-gNB TDM resource division, frequency synchronization reference gNB0, a guard period on each resource and other basic configuration information.

In step S302, time-frequency domain synchronization between the base stations is realized, division of N time-domain resources is determined, and so on. The time synchronization of the gNB1 may adopt an absolute synchronization manner, such as GPS synchronization; and the frequency synchronization may use a reference base station gNB0 to complete the air interface time-frequency synchronization between the gNBs.

In step S303, the first base station (gNB1) may receive the air interface signal(s) of the inter-gNB communication on the N time-domain resources, and determine respective states of the N time-domain resources. That is, the first base station may detect the states of the N time-domain resources in the following manner: for each time-domain resource: if the air interface signal is not received on the time-domain resource within at least one detection period, the time-domain resource is in an idle state; if the air interface signal transmitted by one second base station is detected out on the time-domain resource within one detection period, the time-domain resource is in an occupied state; and if the air interface signals transmitted by at least two second base stations are detected out on the time-domain resource within one detection period, the time-domain resource is in a resource collision state. The detection period is a time-division multiplexing period of a designated resource.

In step S304, the first base station (gNB1) may receive the air interface signal(s) of the inter-gNB communication on the N time-domain resources, and demodulate the respective states of the N time-domain resources. That is, the first base station may obtain the respective states of the N time-domain resources provided by each second base station by demodulating the air interface signal, transmitted by each second base station, of the inter-gNB communication, and through an algorithm, for example, that the minority obeys the majority, the final respective states of the N time-domain resources are obtained. In the N time-domain resources, the first base station (gNB1) may select a time-domain resource (in order of priority or randomly) in the idle time-domain resources, for example, a time-domain resource R1, for transmitting an air interface signal. The transmitted air interface signal may include the respective states, detected by the gNB1 in S303, of the N time-domain resources, and may also include other information for interaction, such as interference coordination information or business data.

In step S305, the first base station (gNB1) may perform air interface signal demodulation on other N−1 time-domain resources. If the air interface signal received by the gNB1 indicates that the time-domain resource occupied by the gNB1 has a resource collision, an idle resource is reselected from the N time-domain resources, and the air interface signal is transmitted by using the reselected idle resource.

In addition, if the first base station (gNB1) does not need to transmit the air interface signal, the air interface signal transmitted by the first base station (gNB1) may include an indication signal transmitted by the gNB1 to exit communication between the base stations. After receiving the exit indication signal, other base stations may know that the gNB1 has exited communication between the base stations.

Thus, through the steps of the above method, the first base station may join or exit communication between the base stations, and when communicating, mutually notify the respective states of the N time-domain resources of the same communication resource by different base stations through the air interface signal, so occurrence of resource collisions is avoided as much as possible. Through the above communication, when resource collisions occur, the resource collisions may be quickly discovered and solved quickly, to ensure the time latency requirement and reliability of the entire communication system.

It should be understood that the steps of the above method are only an exemplary description of the method for communication between the base stations of the present application by using the first base station as the described object, and the execution order of the steps is not fixed. In addition, for other base stations (for example, second base stations gNB2, gNB3, etc.), communication and information exchange with other base stations may also be implemented through the steps of the above method, which will not be repeated here.

Based on the same inventive concept, embodiments of the present application further provide a base station. The base station may implement the method for communication described above in the present application. The base station may be the above first base station, or the second base station, or the reference base station. For illustration in the following embodiments, the first base station is used as a described object for description.

Figure 4:
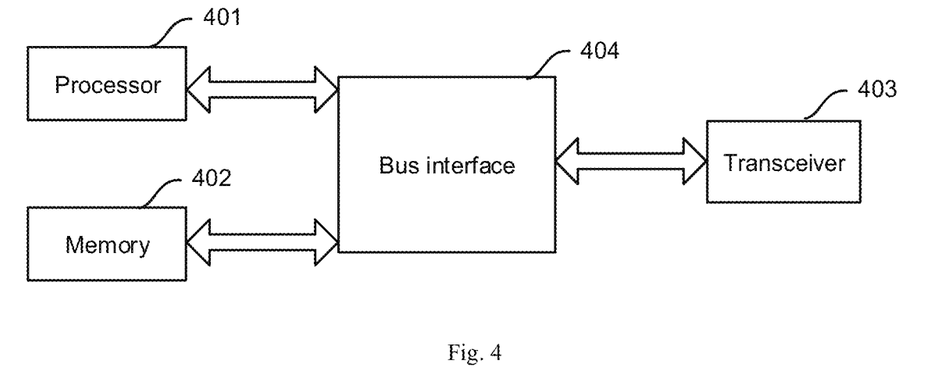
FIG. 4 is a schematic structural diagram of a base station according to an embodiment of the present application.

FIG. 4 is a schematic structural diagram of a base station according to an embodiment of the present application.

As shown in FIG. 4, the first base station of the present application may include a processor 401, a memory 402, a transceiver 403 and a bus interface 404.

The processor 401 is responsible for managing a bus architecture and general processing, and the memory 402 may store data used by the processor 401 in performing operations. The transceiver 403 is configured to receive and transmit data under the control of the processor 401.

The bus architecture may include any number of interconnected buses and bridges, and is linked by various circuits of one or more processors represented by the processor 401 and the memory represented by the memory 402. The bus architecture may also link various other circuits such as peripheral devices, voltage regulators, power management circuits, and the like, which are well known in the art, and therefore, it will not be described further herein. The bus interface provides an interface. The processor 401 is responsible for managing the bus architecture and general processing, and the memory 402 may store the data used by the processor 401 in performing operations.

The processes disclosed according to the embodiments of the present disclosure may be implemented in or by the processor 401. In implementations, the steps of a signal processing flow may be performed by an integrated logic circuit in hardware or instructions in software in the processor 401. The processor 401 may be a general processor, a digital signal processor, a specific integrated circuit, a field programmable gate array or other programmable logic device, a discrete gate or transistor logic device, and a discrete hardware component, which may implement or perform the methods, steps, and logic block diagrams disclosed in the embodiments herein. The general processor may be a microprocessor, any conventional processor, etc. The steps of the method disclosed in connection with the embodiments of the present disclosure may be embodied directly in hardware processor execution or in a combination of hardware and software modules in the processor. The software module may be located in a random access memory, flash memory, read only memory, programmable read only memory, or electrically erasable programmable memory, register, or other storage media as is well known in the art. The storage medium is located in the memory 402, and the processor 401 reads the information in the memory 402 and completes the steps of the signal processing flow in combination with the hardware thereof.

For example, the processor 401 is configured to read a computer instruction in the memory 402 and execute the following process.

Through an air interface signal, respective states of N time-domain resources of a designated resource are exchanged with a second base station that uses the designated resource. N≥1, the designated resource is a resource for communication between base stations, and the N time-domain resources are obtained by means of division on the basis of a time-division multiplexing (TDM) technique.

In one embodiment, a state of each time-domain resource is one of being occupied, being idle, or resource collision.

In one embodiment, the transceiver 403 may be configured to: receive the air interface signal on a time-domain resource that is not occupied by the first base station in the designated resource, and the air interface signal is transmitted by at least one second base station and configured to indicate states, detected out by the second base station, of the N time-domain resources; and the processor 401 may be configured to: based on the received air interface signal, determine the respective states of the N time-domain resources.

In one embodiment, the processor 401 is further configured to: select an idle resource from the N time-domain resources according to the state of each time-domain resource carried in the received air interface signal; and the transceiver is configured to: transmit the air interface signal by using the selected idle resource, and the transmitted air interface signal is configured to indicate states, detected out by the first base station, of the N time-domain resources.

In one embodiment, the processor 401 is configured to detect the states of the N time-domain resources in the following manner: for each time-domain resource: if the air interface signal is not received on the time-domain resource within at least one detection period, the time-domain resource is in an idle state; the detection period is a time-division multiplexing period of the designated resource; if the air interface signal transmitted by one second base station is detected out on the time-domain resource within one detection period, the time-domain resource is in an occupied state; and if the air interface signals transmitted by at least two second base stations are detected out on the time-domain resource within one detection period, the time-domain resource is in a resource collision state.

In one embodiment, after transmitting the air interface signal by using the selected idle resource, the processor 401 is further configured to: if the received air interface signal indicates that the time-domain resource occupied by the first base station has a resource collision, reselect an idle resource from the N time-domain resources to transmit the air interface signal by using the reselected idle resource.

In one embodiment, sizes of the N time-domain resources are the same or not completely the same.

Since the base station may be a base station in the method in the embodiments of the present application, and the principle of the base station to solve the problem is the same as the method, the implementation of the base station may refer to the implementation of the method, and the repetition will not be repeated.

Based on the same inventive concept, embodiments of the present application further provide a device for communication between base stations, and the device for communication may implement the method for communication described above in the present application. The device for communication may be the above first base station, or the second base station. For illustration in the following embodiment, the first base station is applied for description.

Figure 5:
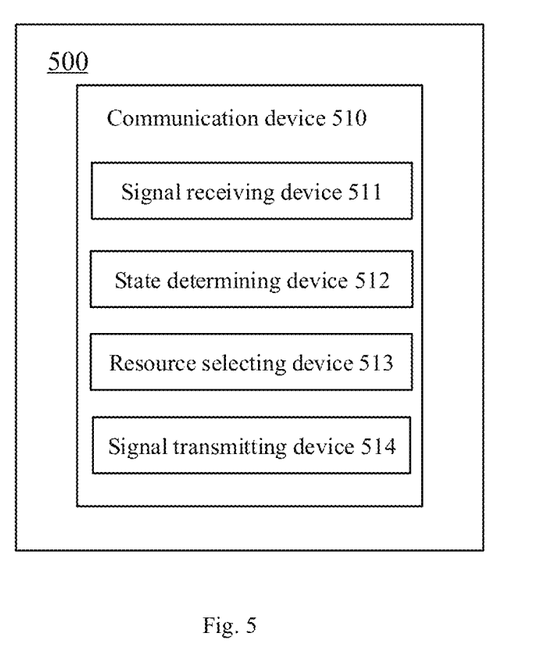
FIG. 5 is a schematic diagram of a device for communication according to an embodiment of the present application.

FIG. 5 is a schematic structural diagram of a device for communication according to an embodiment of the present application.

As shown in FIG. 5, the device for communication 500 of the present application may include, for example, a communication device 510. The communication device may be configured to exchange, by means of an air interface signal, respective states of N time-domain resources of a designated resource with a second base station that uses the designated resource. N≥1, the designated resource is a resource for communication between the base stations, and the N time-domain resources are obtained by means of division on the basis of a time-division multiplexing (TDM) technique.

In one embodiment, a state of each time-domain resource is one of being occupied, being idle, or resource collision.

In one embodiment, the communication device 510 may include:
- a signal receiving device 511, configured to receive the air interface signal on a time-domain resource that is not occupied by the first base station in the designated resource, and the air interface signal is transmitted by at least one second base station and configured to indicate states, detected out by the second base station, of the N time-domain resources; and
- a state determining device 512, configured to determine the respective states of the N time-domain resources based on the received air interface signal.

In one embodiment, the communication device 510 may further include:
- a resource selecting device 513, configured to select an idle resource from the N time-domain resources according to the state of each time-domain resource carried in the received air interface signal; and
- a signal transmitting device 514, configured to transmit the air interface signal by using the selected idle resource, and the transmitted air interface signal is configured to indicate states, detected out by the first base station, of the N time-domain resources.

In one embodiment, the state determining device 512 may detect the states of the N time-domain resources in the following manner: for each time-domain resource: if the air interface signal is not received on the time-domain resource within at least one detection period, the time-domain resource is in an idle state; if the air interface signal transmitted by one second base station is detected out on the time-domain resource within one detection period, the time-domain resource is in an occupied state; and if the air interface signals transmitted by at least two second base stations are detected out on the time-domain resource within one detection period, the time-domain resource is in a resource collision state. The detection period is a time-division multiplexing period of the designated resource.

In one embodiment, after transmitting the air interface signal by using the selected idle resource, the resource selecting device 513 may be further configured to:

if the air interface signal received by the signal receiving device indicates that the time-domain resource occupied by the first base station has a resource collision, reselect an idle resource from the N time-domain resources to transmit the air interface signal by using the reselected idle resource.

In one embodiment, sizes of the N time-domain resources are the same or not completely the same.

So far, the base station or device for communication for realizing communication between the base stations of the present application has been described with reference to FIGS. 4-5, the implementation principle of the base station or the device for communication is the same as that of the above method. For implementation, please refer to the relevant description above in conjunction with FIGS. 1-3, which will not be repeated here.

Embodiments of the present application further provide a computer readable non-transitory storage medium, including a computer program, and when the computer program runs on a computer, the computer program is configured to make the computer execute the step of determining a target access cell in the above embodiments of the present application.

The present application is described with reference to block diagrams and/or flowcharts of the method, the device (system), and/or a computer program product according to the embodiments of the present application. It is to be understood that each block of the block diagrams and/or flowcharts, and combinations of blocks in the block diagrams and/or flowcharts, may be implemented by computer program instructions. These computer program instructions may be provided to a processor of a general purpose computer, or special purpose computer, and/or other programmable data processing devices to produce a machine, and the instructions, which execute via the processor of the computer or other programmable data processing devices, produce a method for implementing the functions/actions specified in the blocks of the block diagrams and/or the flowcharts.

Correspondingly, the present application may be implemented by hardware and/or software (including firmware, resident software, microcode, etc.). Furthermore, the present application may take a form of a computer program product on a computer-usable or computer-readable storage medium, which has a computer-usable or computer-readable program code implemented in the medium for use by or in combination with an instruction execution system. In the context of the present application, the computer-usable or computer-readable medium may be any medium that may contain, store, communicate, transmit, or convey a program for use by the instruction execution system, apparatus, or device, or in combination with the instruction execution system, apparatus, or device.

What is claimed is:

1. A method for communication between base stations, applied in a first base station and comprising:
   exchanging, through an air interface signal, states of N time-domain resources of a designated resource with a second base station,
   wherein N≥1, the designated resource is a resource for communication between the first base station and the second base station, and the N time-domain resources are obtained by dividing the designated resource in a time-division multiplexing (TDM) mode.

2. The method according to claim 1, wherein a state of each time-domain resource is one of an occupied state, an idle state, or a resource collision state.

3. The method according to claim 1, wherein the exchanging, through an air interface signal, states of N time-domain resources of the designated resource with the second base station, comprises:
  receiving an air interface signal on a time-domain resource that is not occupied by the first base station in the designated resource, wherein the air interface signal is transmitted by at least one second base station and configured to indicate states, detected out by the second base station, of the N time-domain resources; and
  detecting out respective states of the N time-domain resources based on the received air interface signal.

4. The method according to claim 3, wherein the exchanging, through an air interface signal, states of N time-domain resources of the designated resource with the second base station, further comprises:
  selecting an idle resource from the N time-domain resources according to the states of the N time-domain resources indicated in the received air interface signal; and
  transmitting an air interface signal by using the selected idle resource, wherein the transmitted air interface signal is configured to indicate states, detected out by the first base station, of the N time-domain resources.

5. The method according to claim 3, wherein states of the N time-domain resources are detected as follows for each time-domain resource:
  when an air interface signal is not received on the time-domain resource within at least one detection period, the time-domain resource is in an idle state;
  when an air interface signal transmitted by one second base station is detected out on the time-domain resource within one detection period, the time-domain resource is in an occupied state; and
  when air interface signals transmitted by at least two second base stations are detected out on the time-domain resource within one detection period, the time-domain resource is in a resource collision state;
  wherein the detection period is a time-division multiplexing period of the designated resource.

6. The method according to claim 4, wherein after transmitting the air interface signal by using the selected idle resource, the method further comprises:
  when an received air interface signal indicates that the selected idle resource occupied by the first base station is in a resource collision state, reselecting an idle resource from the N time-domain resources to transmit the air interface signal by using the reselected idle resource.

7. The method according to claim 1, wherein sizes of the N time-domain resources are same or not completely same.

8. A first base station comprising a processor, a memory and a transceiver,
  wherein the processor is configured to read a program in the memory and perform:
  exchanging, through an air interface signal, states of N time-domain resources of a designated resource with a second base station,
  wherein $N \geq 1$, the designated resource is a resource for communication between the first base station and the second base station, and the N time-domain resources are obtained by division in a time-division multiplexing (TDM) mode.

9. The first base station according to claim 8, wherein a state of each time-domain resource is one of an occupied state, an idle state, or a resource collision state.

10. The first base station according to claim 8- or 9, wherein the transceiver is configured to:
  receive an air interface signal on a time-domain resource that is not occupied by the first base station in the designated resource, wherein the air interface signal is transmitted by at least one second base station and configured to indicate states, detected out by the second base station, of the N time-domain resources; and
  the processor is configured to:
  detect out respective states of the N time-domain resources based on the received air interface signal.

11. The first base station according to claim 10, wherein the processor is further configured to:
  select an idle resource from the N time-domain resources according to the states of the N time-domain resources indicated in the received air interface signal; and
  the transceiver is configured to:
  transmit an air interface signal by using the selected idle resource, wherein the transmitted air interface signal is configured to indicate states, detected out by the first base station, of the N time-domain resources.

12. The first base station according to claim 10, wherein the processor is configured to detect out states of the N time-domain resources as follows for each time-domain resource:
  when an air interface signal is not received on the time-domain resource within at least one detection period, the time-domain resource is in an idle state;
  when an air interface signal transmitted by one second base station is detected out on the time-domain resource within one detection period, the time-domain resource is in an occupied state; and
  when air interface signals transmitted by at least two second base stations are detected out on the time-domain resource within one detection period, the time-domain resource is in a resource collision state;
  wherein the detection period is a time-division multiplexing period of the designated resource.

13. The first base station according to claim 11, wherein after transmitting the air interface signal by using the selected idle resource, the processor is further configured to:
  when an received air interface signal indicates that the selected idle resource occupied by the first base station is in a resource collision state, reselect an idle resource from the N time-domain resources to transmit the air interface signal by using the reselected idle resource.

14. The first base station according to claim 8, wherein sizes of the N time-domain resources are same or not completely same.

15. A computer storage medium, wherein the computer storage medium stores computer executable instructions, and the computer executable instructions are configured to make a computer execute the method according to claim 1.

* * * * *